(12) United States Patent
Sells

(10) Patent No.: US 7,852,639 B2
(45) Date of Patent: Dec. 14, 2010

(54) LOW-LOSS RECTIFIER WITH OPTICALLY COUPLED GATE SHUNTING

(75) Inventor: Troy W. Sells, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 694 days.

(21) Appl. No.: 11/751,800

(22) Filed: May 22, 2007

(65) Prior Publication Data

US 2008/0291699 A1 Nov. 27, 2008

(51) Int. Cl.
H02M 3/335 (2006.01)
(52) U.S. Cl. ........................................ 363/17
(58) Field of Classification Search ............... 363/52, 363/53, 125, 126, 127, 17
See application file for complete search history.

(56) References Cited

U.S. PATENT DOCUMENTS

| | | | |
|---|---|---|---|
| 4,139,880 A | | 2/1979 | Ulmer et al. |
| 4,423,456 A | * | 12/1983 | Zaidenweber ................. 361/77 |
| 4,774,650 A | * | 9/1988 | Kahkipuro et al. .......... 363/132 |
| 4,825,351 A | * | 4/1989 | Uesugi ......................... 363/79 |
| 5,510,972 A | | 4/1996 | Wong |
| 5,623,550 A | * | 4/1997 | Killion ........................ 381/322 |
| 5,808,882 A | * | 9/1998 | Mochikawa .................. 363/46 |
| 5,870,031 A | * | 2/1999 | Kaiser et al. ............. 340/10.34 |
| 5,991,182 A | | 11/1999 | Novac et al. |
| 6,147,545 A | * | 11/2000 | Marshall ...................... 327/424 |
| 6,421,261 B1 | | 7/2002 | Fujisawa et al. |
| 6,549,438 B2 | * | 4/2003 | Malone ......................... 363/89 |
| 6,661,208 B2 | * | 12/2003 | Rutter et al. ................. 323/224 |
| 7,084,609 B2 | * | 8/2006 | Pillote et al. ................... 322/28 |
| 7,269,038 B2 | * | 9/2007 | Shekhawat et al. ............ 363/71 |
| 7,292,445 B2 | * | 11/2007 | Linke ........................... 361/715 |
| 7,339,804 B2 | * | 3/2008 | Uchida ....................... 363/56.1 |
| 7,388,404 B1 | * | 6/2008 | Miller .......................... 326/82 |
| 7,411,768 B2 | * | 8/2008 | Sells ............................ 361/77 |
| 7,420,224 B2 | * | 9/2008 | Milich et al. ................. 257/177 |
| 7,443,142 B2 | * | 10/2008 | O'Gorman et al. ............ 322/24 |
| 7,478,254 B2 | * | 1/2009 | Kawai .......................... 713/323 |
| 7,541,694 B2 | * | 6/2009 | Chamberlain et al. ......... 307/66 |
| 7,561,404 B2 | * | 7/2009 | Sells ........................... 361/246 |
| 7,602,161 B2 | * | 10/2009 | McLeod ...................... 323/273 |
| 2007/0296363 A1 | * | 12/2007 | Andrejak et al. ............ 318/504 |
| 2009/0273959 A1 | * | 11/2009 | Sells ........................... 363/127 |

* cited by examiner

Primary Examiner—Adolf Berhane
Assistant Examiner—Yemane Mehari
(74) Attorney, Agent, or Firm—Fox Rothschild, LLP; Robert J. Sacco

(57) ABSTRACT

A rectifier circuit (400) is provided. The rectifier circuit is comprised of a plurality of field effect transistors (102, 104, 106, 108) coupled together to define a rectifier circuit. The rectifier circuit is also comprised of a control circuit (600) and a switching device (420, 430, 440, 450). The switching device is configured to selectively disable a conduction channel extending between a source and a drain of at least one of the field effect transistors in response to the control circuit to prevent a shoot-through current in the rectifier circuit.

14 Claims, 8 Drawing Sheets

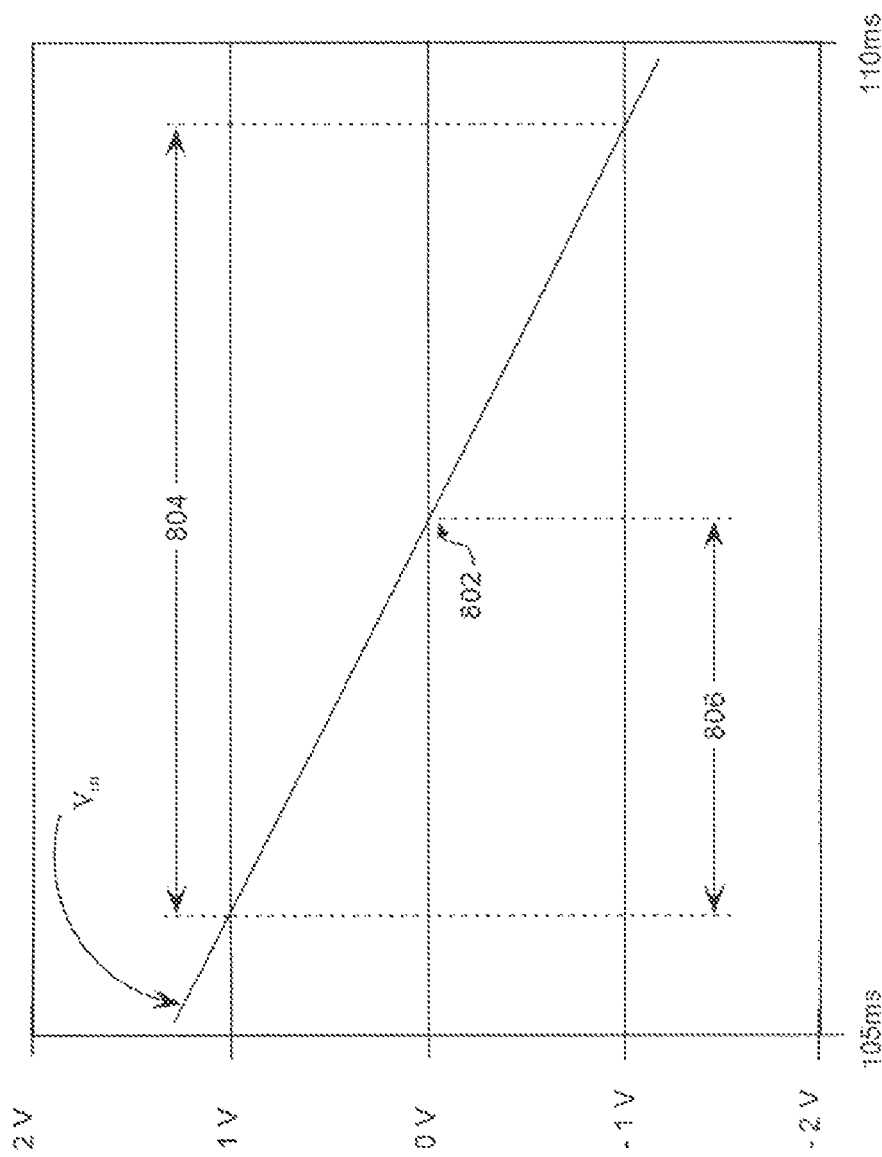

LOW-LOSS RECTIFIER WITH OPTICALLY COUPLED GATE SHUNTING

BACKGROUND OF THE INVENTION

1. Statement of the Technical Field

The inventive arrangements relate to MOSFET circuits, and more particularly to a circuit for AC voltage rectification and shoot-through current protection.

2. Description of the Related Art

Bridge rectifier type devices are typically used to convert an AC waveform into a DC waveform. Such bridge rectifier type devices often utilize diode components to perform the rectification function. After an AC signal is rectified, the output signal is often filtered to remove unwanted spectral content and to produce a DC voltage. A filtering device utilizing capacitor components, resistor components, and/or inductor components are typically used for this purpose.

Despite the various technologies known in the art, there remains a need for a MOSFET bridge rectifier type device that can rectify a domestic AC input (for example, 120V, 60 Hz) and/or a foreign AC input (for example, 230V, 50 Hz) with low power loss. However, rectification of an AC signal with a MOSFET type bridge rectifier can create potentially damaging current spikes in an input current. For example, a shoot-through current may result at a zero crossing of an input voltage. The shoot-through current can occur when MOSFETs conduct simultaneously during transitions. The shoot-through current can produce a current spike through the drain of each MOSFET component. This current spike causes a relatively large amount of stress on the MOSFET devices. As a result, at least one of the simultaneously conducting MOSFETs can be damaged. In this regard, a MOSFET bridge rectifier type device is also needed with a shoot-through protection circuit to eliminate the amount of stress on the MOSFET devices during transitions.

SUMMARY OF THE INVENTION

The invention concerns a rectifier circuit. The rectifier circuit is comprised of a plurality of field effect transistors. The field effect transistors are coupled together to define the rectifier circuit. For example, the rectifier circuit can be a full wave bridge rectifier. The rectifier circuit is also comprised of a control circuit and at least one switching device. The switching device is configured to selectively disable a conduction channel extending between a source and a drain of at least one of the field effect transistors in response to the control circuit to prevent a shoot-through current in the rectifier circuit.

According to an aspect of the invention, the switching device is coupled between a gate and source of the field effect transistor. The switching device disables the conduction channel by forming a low resistance path between the gate and source of the field effect transistor. The switching device is advantageously comprised of a phototransistor and a light emitting diode coupled to the control circuit. The light emitting diode and phototransistor comprise a photocoupler.

According to another aspect of the invention, the control circuit is comprised of at least a zero-crossing detector circuit. The zero-crossing detector circuit is configured to detect when an input voltage of the rectifier circuit is within a predetermined range approximating a value around zero (0) volts. The zero-crossing detector circuit comprises at least one voltage reference device for establishing a voltage reference for determining a zero crossing. A comparator is coupled to the voltage reference.

The invention also concerns a method for controlling a shoot-through current in a rectifier circuit constructed from a plurality of field effect transistors. The method includes a determining step. The determining step involves determining a time period associated with a zero crossing of an instantaneous voltage defining an AG input of the rectifier circuit. This time period is determined in a voltage domain by measuring when an input voltage crosses a threshold voltage level associated with a zero crossing. The method also includes a disabling step. The disabling step involves selectively disabling a conduction channel extending between a source and a drain of at least two of the field effect transistors. This disabling of the conduction channel is responsive to the determination of the time period associated with the zero crossing of an instantaneous voltage.

According to an aspect of the invention, the method includes disabling the conduction channel during at least a portion of the time period. The method also includes selecting the time period to include a moment in time when the zero crossing actually occurs. The method further includes selecting a beginning of the time period to occur a predetermined duration before the zero crossing actually occurs. The predetermined duration is determined in a voltage domain by measuring when an input voltage crosses a threshold voltage associated with the zero crossing.

According to another aspect of the invention, the method includes selecting the predetermined duration to correspond to a response time necessary to perform the disabling step. The determining step further comprises determining when the instantaneous voltage is within a predetermined range approximating a value around zero (0) volts. The disabling step further includes forming a low resistance path between a gate and source of the field effect transistor. The method also includes generating a control signal responsive to the determination of a zero crossing of an instantaneous voltage. The method further includes forward biasing a light emitting diode with the control signal to generate a photonic emission from the light emitting diode.

According to yet another aspect of the invention, the method includes exciting a phototransistor with the photonic emission to form a low resistance path between a gate and source. The method also includes selecting the rectifier circuit to include four field effect transistors. The method further includes arranging the field effect transistors to form a full wave bridge rectifier.

BRIEF DESCRIPTION OF THE DRAWINGS

Embodiments will be described with reference to the following drawing figures, in which like numerals represent like items throughout the figures, and in which:

FIG. 8 is a time graph showing an instantaneous voltage representing an AC input of the transistor active bridge circuit.

DETAILED DESCRIPTION OF THE PREFERRED EMBODIMENTS

Figure 1:
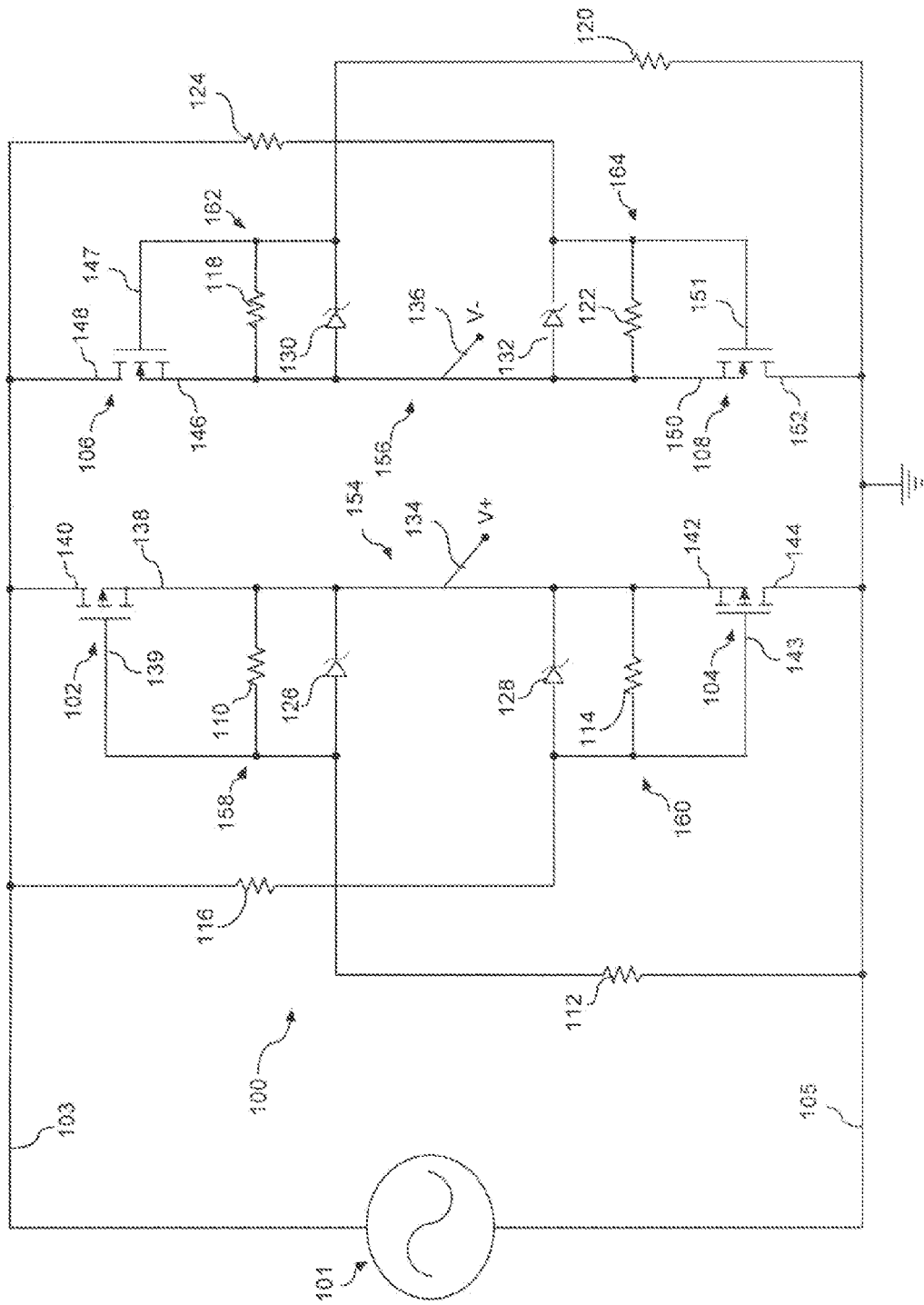
FIG. 1 is a schematic representation of a transistor active bridge circuit.

A transistor active bridge circuit 100 is shown in FIG. 1. The circuit 100 shown is useful for a variety of purposes, including rectification of a domestic AC input (for example, 120V, 60 Hz) and/or foreign AC input (for example, 230V, 50 Hz) with low power loss. As may be observed in FIG. 1, circuit 100 is connectable between a pair of input lines 103, 105 and a pair of output lines 134, 136.

Circuit 100 includes first and second field effect transistors 102, 104 of a first channel type. The transistor active bridge circuit also includes third and fourth field effect transistors 106, 108 of a second channel type that is different from the first channel type. For example, the first and second field effect transistors 102, 104 can be P-channel type whereas the third and fourth field effect transistors 106, 108 can be N-channel type. Each of the field effect transistors can be enhancement mode devices. For example, the P-channel type transistor can be model number Si7431DP, which is available from Vishay Intertechnology, Inc. of Malvern, Pa. The N-channel device can be Si4490DY, which is also available from Vishay Intertechnology, Inc. Still, it should be understood that other types of field effect transistors can also be selected depending upon the anticipated voltage and current handling requirements of circuit 100.

Figure 2A:
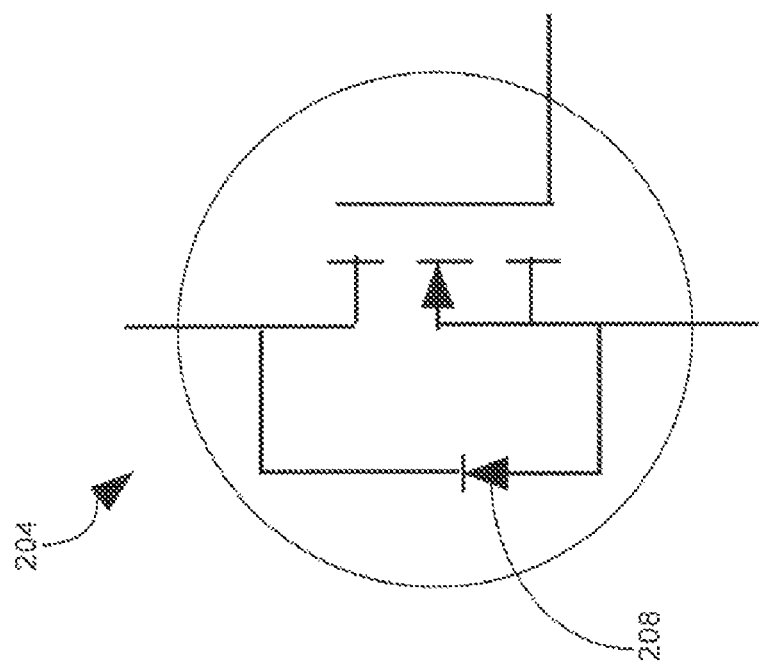
FIG. 2 is a schematic representation of a MOSFET device showing an intrinsic body diode.
Figure 2B:
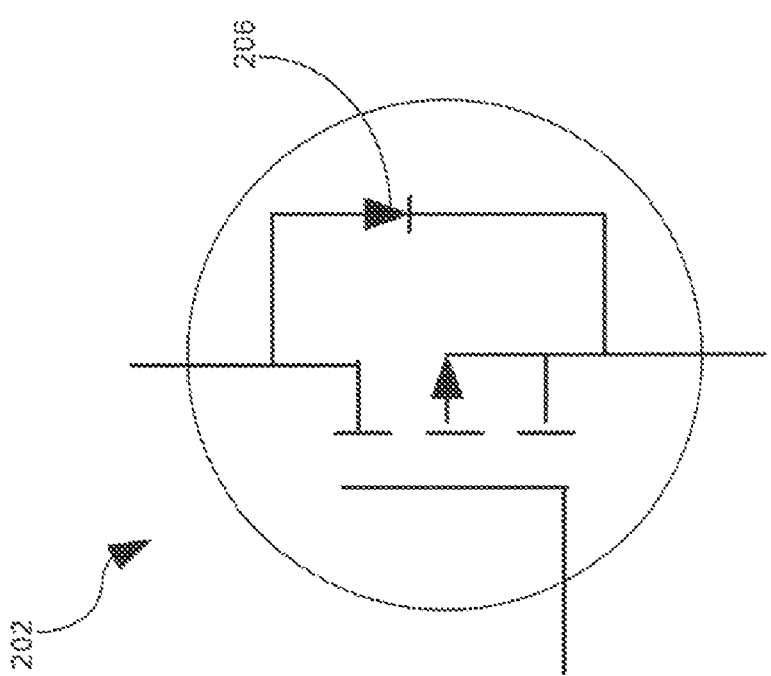

As will be understood by those skilled in the art, each of field effect transistor 102, 104, 106, 108 will have three terminals respectively defined as a source, gate and drain. With regard to field effect transistor 102, the source, gate and drain terminals are respectively identified with reference numbers 138, 139, and 140. With regard to field effect transistor 104, the source, gate and drain terminals are respectively identified with reference numbers 142, 143, and 144. The source gate and drain terminals of transistor 106 and 108 are respectively identified as 146, 147, 148 and 150, 151, 152. An electrical path can be provided from the source to the drain of each field effect transistor 102, 104, 106, and 108. This path is generally referred to herein as the source-drain path. Although not always shown in schematic illustrations, field effect transistor devices, such as MOSFETs typically have an intrinsic body diode that results from the manner in which the devices are manufactured. This intrinsic body diode 206, 208 is illustrated in FIGS. 2A and 2B for a P-channel 202 and N-channel device 204. The importance of this body diode will become clear in the discussion below regarding the detailed operation of the circuit.

Referring again to FIG. 1, it can be observed that a source-drain path of first field effect transistor 102 can be connected in series with a source-drain path of the second field effect transistor 104. The series connected transistor pair 102, 104 form a first series transistor combination that can be connected across the input lines 103, 105. A source-drain path of the third field effect transistor 106 can be connected in series with a source-drain path of the fourth field effect transistor 108 to form a second series transistor combination connected across the input lines 103, 105.

The circuit 100 can have an output defined by output lines 134, 136. A first one of the output lines 134 can be connected to the first series combination 102, 104 at an interconnection point 154 between the first and the second field effect transistors 102, 104. A second one of the output lines 136 can be connected to the second series combination 106, 108 at an interconnection point 156 between the third and fourth field effect transistors 106, 108.

A voltage divider circuit can be provided for each of the field effect transistors 102, 104, 106, 108. The voltage divider circuit can be comprised of a first resistor and a second resistor connected in series. However, those skilled in the art will appreciate that numerous different types of voltage dividers circuits are possible and can be used for the purposes as hereinafter described. The voltage divider circuit for the first field effect transistor 102 can include first resistor 110 and second resistor 112. The voltage divider circuit for the second field effect transistor 104 can include first resistor 114 and a second resistor 116. Similarly, the voltage divider circuit for the third and fourth field effect transistors 106, 108 can include first resistors 118, 122 and second resistors 120, 124.

In FIG. 1, the first and second resistors are connected in series from a source of each field effect transistor to one of the input lines. For example, the resistor combination 110, 112 is connected to source 138 of field effect transistor 102 to input line 105. The resistor combination 114, 116 is connected to source 142 of field effect transistor of 104 to input line 103. Each voltage divider advantageously provides a bias voltage tap 158, 160, 162, and 164. For example, if a resistive voltage divider is used as shown in FIG. 1, then, the bias voltage tap can be provided at a connection point between the first and second resistors. The bias voltage tap 158, 160, 162, 164 of each voltage divider is connected to a gate 139, 143, 147, 151 of each respective one of the field effect transistors. Consequently, the bias voltage tap 158, 160, 162, 164 advantageously provides a substantially reduced voltage output relative to the input voltage applied to the voltage divider circuit 100 by power source 101. For example, the bias voltage tap of the voltage divider can provide an output that is reduced by 10% to 90% relative to the input voltage.

Notably, the transistor active bridge circuit 100 is not limited to any particular range of voltage reduction by the voltage divider. The purpose of the voltage divider is to permit a relatively larger range of input voltages to be applied across input lines 103, 105 without producing excessively high voltage levels between the gate and source of each held effect transistor. However, the voltage divider should still produce a bias voltage between each transistor gate 139, 143, 147, 151 and a respective source 138, 142, 146, 150 that is of sufficient magnitude to self bias each transistor for a predetermined range of input voltage applied across the input lines 103, 105. For example, the first resistor 110, 114, 118, 122 can be selected to be about 100 kΩ and the second resistor 112, 116, 120, 124 can be selected to be about 30 kΩ. This combination will provide a voltage reduction of about 23%. Still, those skilled in the art will appreciate that a variety of other voltage divider values can and should be used depending upon the design criteria for input voltage range and transistor specifications.

Circuit 100 can also include a voltage clamping circuit to ensure that the voltage applied, gate to source, across each of the field effect transistors does not become excessively large as the input voltage is increased. Any suitable voltage clamping circuit can be used for this purpose. For example, the voltage clamp could be simply implemented as a zener diode 126, 128, 130, 132 that is connected in parallel with first resistor 110, 114, 118, 122 between the gate and the source of each respective one of the field effect transistors 102, 104, 106, 108.

The zener diodes 126, 128, 130, 132 can ensure that the voltage between the gate and source terminals is limited. For example, the zener diode can prevent the voltage between the gate and source of each field effect transistor 102, 104, 106, 108 from exceeding a predetermined threshold voltage defined by the reverse breakdown voltage of the zener diode. A further advantage of using a voltage clamp as described herein is it allows adequate bias voltage levels to be developed between the gate 139, 143, 147, 151 and the source 138, 142, 146, 150, of each field effect transistor 102, 104, 106, 108, even with relatively low input voltages across lines 103, 105. For example, the voltage divider can be designed to allow a relatively large proportion of the input voltage (e.g. 70%) to appear at bias voltage tap 158, 160, 162, 164. The larger proportion of voltage ensures that the field effect transistors will be biased to their on state, even with relatively low input voltages from power source 101. In order to ensure that this larger proportion of voltage does not damage the field effect transistors when considerably higher input voltages are applied to the circuit 100, the clamping circuit (zener diode 126, 128, 130, 132 in FIG. 1) can clamp the output of the voltage divider at a predetermined level.

The operation of the circuit 100 will now be described in greater detail. When input line 103 is positive relative to input line 105, an intrinsic body diode associated with each of the field effect transistors 102 and 108 will be forward biased and current will begin to flow between the drain and source of these devices. This will produce a voltage at bias voltage tap 158, 164 as current begins to flow through the voltage divider circuits associated with the respective field effect transistors 102, 103. The voltage produced at the voltage tap 158, 164 can be used to self bias the field effect transistors 102, 108, thereby switching these transistors to their "on" state. When switched to their on state, a relatively low resistance path is created between drain 140, 152 and source 138, 150 of field effect transistors 102, 108. The exact amount of this resistance will depend upon several factors, including the specified drain-source on state resistance of the field effect transistors. For example "on" state resistance values of between 0.5 mΩ and 10Ω are typical for such devices. Generally P channel devices have a slightly higher resistance as compared to N channel devices. Once turned on, however, current will continue to flow between the drain and source of transistors 102, 108 through the low resistance path, thereby eliminating the voltage drop associated with the body diode. Consequently, if a load is connected across output lines 134, 136 the voltage drop caused by the bridge circuit can be considerably less than the typical diode drop associated with a conventional diode bridge. In this regard, if may be noted that in a conventional diode bridge circuit, the output voltage drop will include two diode drops. Accordingly, the voltage drop in a conventional diode bridge can be in the range from 1.2V to 1.6V or more.

If the input voltage applied across input lines 103, 105 is sufficiently high, it will exceed a reverse breakdown voltage of zener diodes 126, 132. This will cause the zener diodes to clamp the voltage applied across the gate to source terminals of each field effect transistor 102, 108. When the input voltage polarity is reversed, field effect transistors 102, 108 will be switched off, and field effect transistors 104, 106 will turn on in a manner similar to that described above.

Figure 3:
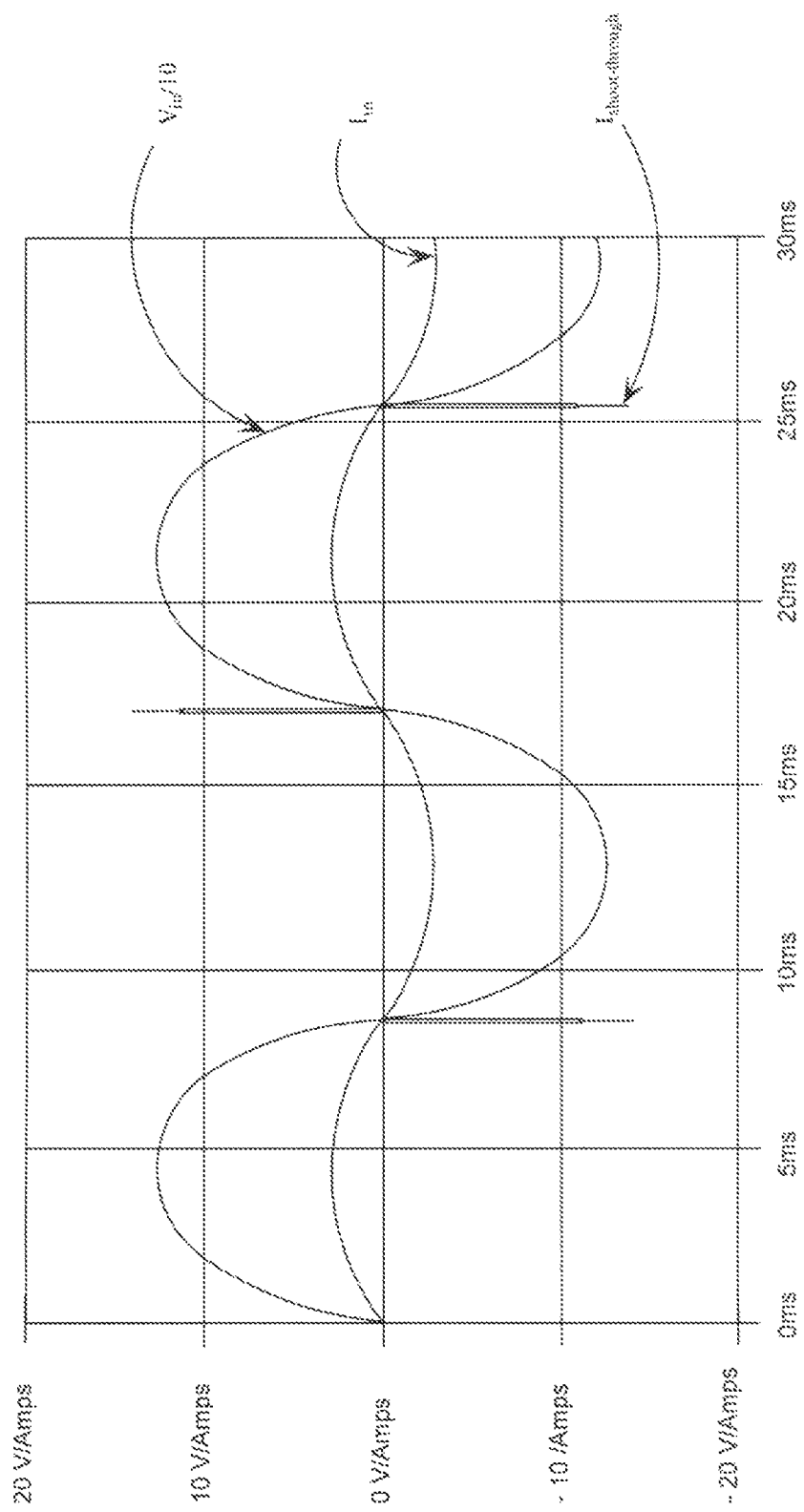
FIG. 3 is a time graph showing a shoot-through current resulting at an input voltage zero crossing.

Referring now to FIG. 3, a time graph is provided that shows a shoot-through current resulting at a zero crossing of an input voltage ($V_{in}$) and an input current ($I_{in}$) applied by an external power source. The shoot-through current can occur when the field effect transistors 102, 104 or 106, 108 conduct simultaneously. For example, a large transient shoot-through current can flow directly from the external power source connected to input lines 103, 105 when the field effect transistor 104 is biased to its "on" state (i.e., conducting state) before the field effect transistor 102 has fully transitioned info a state of cutoff (i.e., non-conducting state), it should be appreciated that this can occur as a result of a field effect transistors parasitic capacitance discharging through the bias network. In such a scenario, a short circuit is created across the input lines 103, 105 between the source-drain paths of the field effect transistors 102, 104. As a result, at least one of the simultaneously conducting field effect transistors 102, 104 may be damaged, a fuse can be blown, a breaker can be tripped, and/or an external power source can experience an overload. Therefore, a shoot-through protection circuit is needed to prevent the field effect transistors 102, 104 and 106, 108 from conducting simultaneously during transitions. Such a circuit is shown in FIG. 4.

Figure 4:
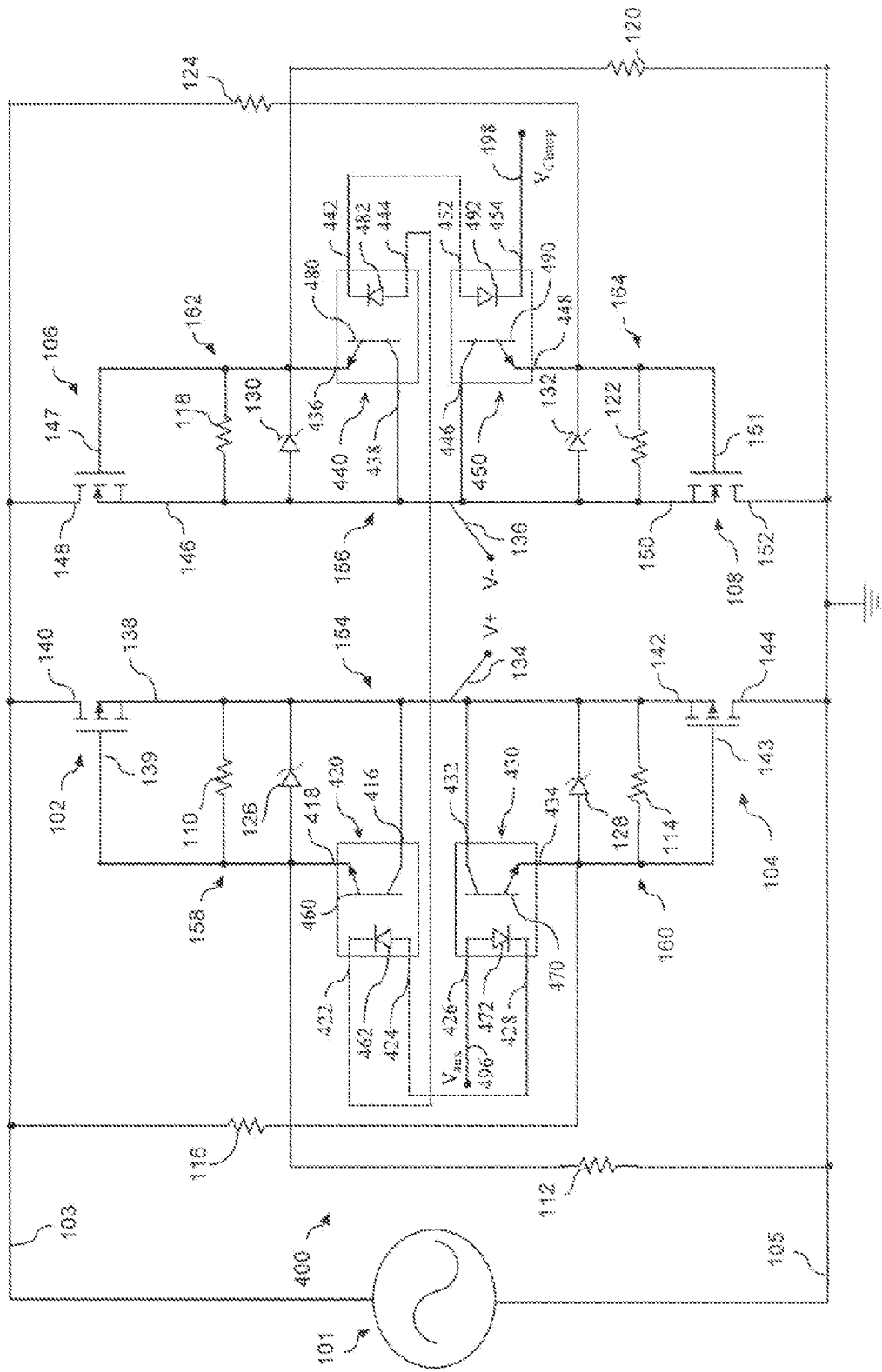
FIG. 4 is a schematic representation of a transistor active bridge circuit with shoot-through current protection.

A transistor active bridge circuit 400 with shoot-through current protection is shown in FIG. 4. The transistor active bridge circuit 400 is arranged as a full wave bridge rectifier. The components of transistor active bridge circuit 400 are generally similar to those of transistor active bridge circuit 100, and thus, the description above will suffice with respect to the similar components which are identified with like reference numbers. In addition, the transistor active bridge circuit 400 includes a shoot-through protection circuit for each field effect transistor 102, 104, 106, 108.

According to an embodiment of the invention, the shoot-through protection circuit can be comprised of one or more switching devices 420, 430, 440, 450 coupled to each field effect transistor 102, 104, 106, 108. The switching devices 420, 430, 440, 450 are advantageously connected between the gate and source of each respective one of the field effect transistors 102, 104, 106, 108. The switching devices 420, 430, 440, 450 are configured to selectively disable a conduction channel extending between a source and drain of each respective one of the field effect transistors 102, 104, 106, 108 in response to a control signal to prevent a shoot-through current in the transistor active bridge circuit 400. As used herein, the phrase "conduction channel" means a low resistance conduction path in which electrons flow from a source and drain of a field effect transistor. The switching devices 420, 430, 440, 450 disable the conduction channel by forming a low resistance path between the gate and source of each respective one of the field effect transistors 102, 104, 106, 108. As used herein, low resistance can refer to any resistance value which is sufficiently low to disable a conduction channel.

According to an embodiment of the invention, each switching device can be an optically controlled device. For example, the switching devices can be comprised of high isolation voltage transistor type photocoupler, such as a PS2501 photocoupler available from NEC Corporation, of Tokyo, Japan. The PS2501 photocoupler is comprised of a NPN silicon phototransistor and a GaAs light emitting diode. Still, the invention is not limited in this regard. The shoot-through protection circuit is also comprised of a control circuit (not shown in FIG. 4) coupled to the switching devices 420, 430, 440, 450. The control circuit is arranged to selectively activate the switching devices in response to the AC input voltage across input lines 103, 105 transitioning through a zero crossing point.

The shoot-through protection circuit shall now be described in further detail with reference to FIG. 4. As shown in FIG. 4, each switching device 420, 430, 440, 450 can be comprised of an NPN phototransistor 460, 470, 480, 490 and a light emitting diode 462, 472, 482, 492. Each switching device 420, 430, 440, 450 has four ports. A first port 418, 434, 436, 448 of each switching device 420, 430, 440, 450 is coupled to an emitter of a respective NPN phototransistor

460, 470, 480, 490. A second port 416, 432, 438, 446 of each switching device 420, 430, 440, 450 is coupled to a collector of a respective NPN phototransistor 460, 470, 480, 490. In effect, an electrical path is provided between the first ports 418, 434, 436, 448 and the second ports 416, 432, 433, 446, herein after referred to as a collector-emitter path. A third port 424, 426, 444, 452 of each switching device 420, 430, 440, 450 is coupled to an anode of a respective light emitting diode 462, 472, 482, 492. A fourth port 422, 428, 442, 454 is coupled to a cathode of a respective light emitting diode 462, 472, 482, 492. In effect, an electrical path is provided between the third ports 424, 426, 444, 452 and the fourth ports 422, 428, 442, 454, hereinafter referred to as an anode-cathode path.

Referring again to FIG. 4, if can be observed that a collector-emitter path of each switching device 420, 430, 440, 450 is connected in parallel with each respective one of the resistors 110, 114, 118, 122 and zener diodes 126, 128, 130, 132. The collector-emitter path of switching devices 420, 430, 440, 450 is also connected between the gate and source of each respective one of the field effect transistors 102, 104, 106, 108. The switching device 420 ensures that the field effect transistor 102 has fully transitioned into a cutoff state (i.e., a non-conducting state) before the field effect transistor 104 is biased to its "on" state (i.e., a conducting state). For example, the switching device 420 shorts field effect transistor's 102 gate 139 to source 138 when the NPN phototransistor 460 is in an "on" mode. The NPN phototransistor 460 is transitioned into the "on" mode when it detects light. The light is provided by the light emitting diode 462 when the light emitting diode is electrically biased in a forward direction. Notably, the light emitting diode 462 is electrically biased in the forward direction by means of the control circuit (not shown in FIG. 4) whenever the control circuit detects that the instantaneous AC input voltage across input lines 103, 105 gets close to a zero value.

When NPN phototransistor 460 is in an "on" mode, current will begin to flow between the collector 416 and emitter 418. In effect, the NPN phototransistor 460 will act like a closed switch. When this occurs, the field effect transistor 102 turns "off." Consequently, the conduction path (conduction channel) between the source 138 and drain 140 is eliminated (or disabled), but the field effect transistor's 102 body diode path remains. This process eliminates the shoot-through current by ensuring that there is never a time when the source drain paths of field effect transistors 102 and 104 are both conducting at the same time. Similarly, the switching device 450 can ensure that the field effect transistor 108 has fully transitioned into a cutoff state before the transistor 106 is biased to its "on" state. This eliminates shoot-through current by ensuring that them is never a time when the source dram paths of the field effect transistors 106 and 108 are both conducting at the same time.

The operation of the switching devices 430, 440 is similar to the operation described above with regard to switching devices 420, 450. In particular, the switching device 430 can ensure that field effect transistor 104 has fully transitioned into a non-conducting state before field effect transistor 102 is biased to its "on" state. Likewise, the switching device 440 can ensure that the field effect transistor 106 has fully transitioned into it's "off" state before the field effect transistor 108 is biased to its "on" state. Accordingly, the possibility of shoot-through current is eliminated.

Figure 6:
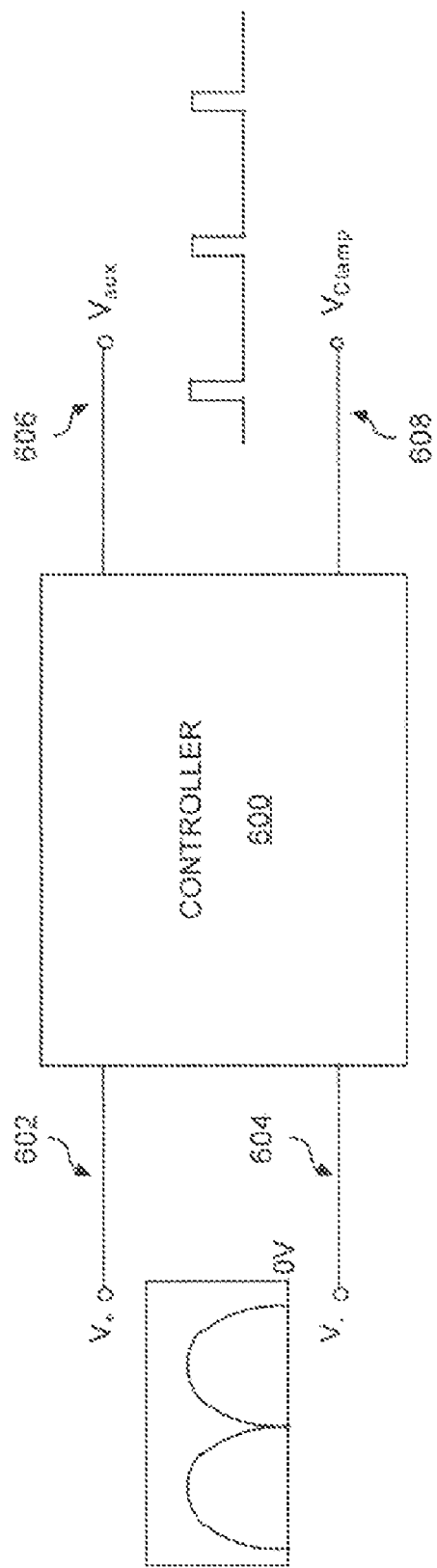
FIG. 6 is a schematic representation of a black box control circuit for driving a shoot-through protection circuit.

According to the embodiment shown in FIG. 4, the NPN phototransistors 460, 470, 480, 490 are all transitioned into their "on" and their "off" state concurrently. It will be appreciated that in such an embodiment, a single control circuit can advantageously be used for controlling all of the switching devices 420, 430, 440, 450. For example, a control circuit 600 is shown in FIG. 6 which can be used for this purpose. However, it should be appreciated that the invention is not limited in this regard. For example, transistor pair 102, 108 can each be controlled using a separate control signal as compared to transistors 104, 106. In such a scenario, the switching devices 420, 450 can be respectively controlled by different control circuits. The use of two separate control circuits (or at least separate control signals) can allow the NPN phototransistors 460, 490 to be transitioned into their "on" mode while the NPN phototransistors 470, 480 remain in their "off" mode, and vise versa.

The operation of the circuit 400 will now be described in greater detail. When input line 103 is positive relative to input line 105, an intrinsic body diode associated with each of the field effect transistors 102 and 108 will be forward biased and current will begin to flow between the drain and source of these devices. This will produce a voltage at bias voltage tap 158, 164 as current begins to flow through the voltage divider circuits associated with the respective held effect transistors 102, 108. The voltage produced at the voltage tap 158, 164 can be used to self bias the field effect transistors 102, 108, thereby switching these transistors to their "on" state. When switched to their "on" state, a relatively low resistance path is created between drain 140, 152 and source 138, 150 of field effect transistors 102, 108. The exact amount of this resistance will depend upon several factors, including the specified drain-source "on" state resistance of the field effect transistors. For example, "on" state resistance values of between 0.5 mΩ and 10Ω are typical for such devices. Generally, P channel devices have a slightly higher resistance as compared to N channel devices. Once turned on, however, current will continue to flow between the drain and source of transistors 102, 108 through the low resistance path, thereby eliminating the voltage drop associated with the body diode. Consequently, if a load is connected across output lines 134, 136 the voltage drop caused by the bridge circuit can be considerably less than the typical diode drop associated with a conventional diode bridge. In this regard, it may be noted that in a conventional diode bridge circuit, the output voltage drop will include two diode drops. Accordingly, the voltage drop in a conventional diode bridge can be in the range from 1.2V to 1.6V.

If the input voltage applied across input lines 103, 105 is sufficiently high, it will exceed a reverse breakdown voltage of zener diodes 126, 132. This will cause the zener diodes to clamp the voltage applied across the gate to source terminals of each field effect transistor 102, 108.

A control circuit (not shown in FIG. 4) can provide a control current which will flow through a current path including the control lines 496 and 498. When the control circuit detects that the instantaneous input voltage across AC input lines 103, 105 is approaching a zero crossing, the control circuit will provide a control voltage at control line 496 which is positive relative to control line 498. Consequently, current will begin to flow between the anode 424, 426, 444, 452 and cathode 422, 428, 442, 454 of each light emitting diode 462, 472, 482, and 492. Consequently, each light emitting diode 462, 472, 482, 492 will generate a photonic emission (emit light) for exciting a respective one of the phototransistors 460, 470, 480, 490. When light is detected by each phototransistor 460, 470, 480, 490, each of the phototransistors 460, 470, 480, 490 will be biased to it's "on" state and current will begin to flow between the collector and emitter of each device. In effect, each of the phototransistors 460, 470, 480, 490 will act like a closed switch. Consequently, the phototransistors 460, 490 will short the gate and source terminals of the respective field effect transistors 102, 108 such that the conduction path is eliminated (or disabled) between the field effect transistors 102, 108 source 138, 150 and drain 140, 152, respectively. However, the body path diodes of the field effect transistors 102, 108 remain. In this regard, it should be appreciated that the circuit 400 behaves in a manner similar to a standard diode bridge when the phototransistors 460, 470, 480, 490 are biased to their "on" states.

When input line 103 is negative relative to input line 105, field effect transistors 102, 108 will be switched off, and field effect transistors 104, 106 will turn on in a manner similar to that described above with regard to field effect transistors 102, 108. Current will flow from the field effect transistor 104 to a load connected across output lines 134, 136 and return through field effect transistor 106. After a zero crossing of AC voltage source 101 has occurred and there is no immediate risk of current shoot-through, the control circuit can change the control current applied to the light emitting diodes 462, 472, 482, 492. In particular, the control circuit (not shown in FIG. 4) can form an open circuit so that the light emitting diodes 462, 472, 482, 492 will stop emitting light. When the phototransistors 460, 470, 480, 490 stop detecting light, they will be biased to their "off" states. In this "off" state, the phototransistors 460, 470, 480, 490 will act like an open switch. In effect, current will stop flowing between the collector and emitter of the phototransistors 460, 470, 480, 490. This will allow the field effect transistors 104, 106 to be biased into an on state in which a relatively low resistance path is created between the respective drains 148, 144 and sources 142, 146 of field effect transistors 104, 106.

Figure 5:
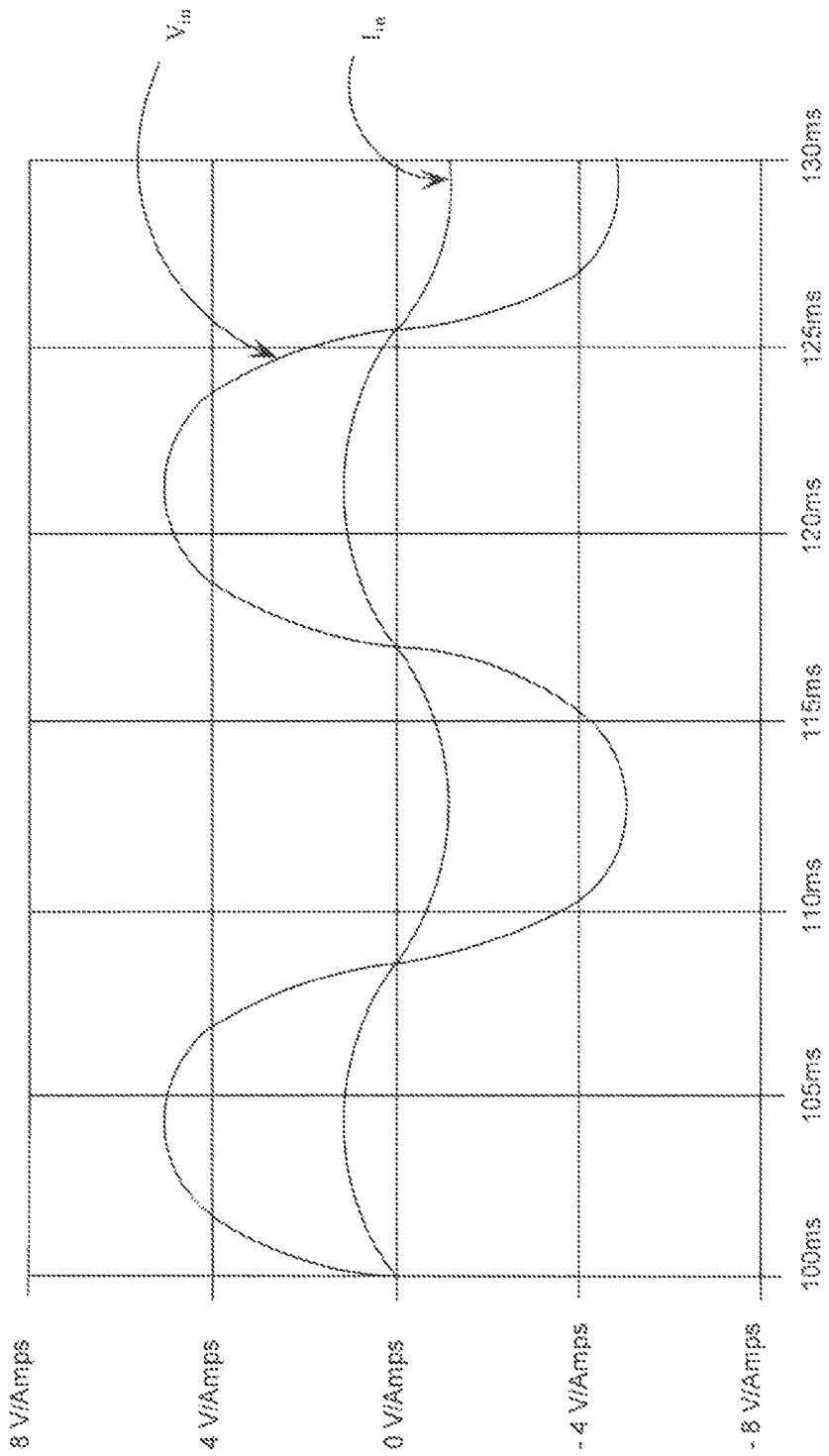
FIG. 5 is a time graph showing the elimination of the shoot-through current shown in FIG. 3.

FIG. 5 is a time graph plotting an input voltage and an input current to the transistor active bridge circuit 400. As shown in FIG. 5, the shoot-through current of FIG. 3 has been eliminated through the implementation of shoot-through protection devices 420, 430, 440, 450 and a control circuit (described below in relation to FIG. 6).

As noted above, the shoot through protection circuit advantageously includes at least one control circuit. The control circuit is advantageously configured to activate the switching devices 420, 430, 440, 450 when the instantaneous AC input voltage across input lines 103, 105 gets close to a zero (0) value. Ideally, the value at which the switching devices are activated (switch closed) should be as close to zero (0) as possible, while still allowing for a sufficient response time to activate the switches and prevent shoot through current. According to one (1) embodiment, the control circuit can be configured to activate the switching devices 420, 430, 440, 450 when the instantaneous value of the AC input voltage is about one (1) or two (2) volts. However, the optimum value in each instance will depend on a variety of design factors. Accordingly, the invention is not limited in this regard and other values can also be used. FIG. 6 shows one example of a suitable control circuit. However, it should be understood that any suitable control circuit can be used, provided that it is capable of controlling the switching devices 420, 430, 440, 450 as described herein.

Referring now to FIG. 6, there is provided is a schematic representation of a control circuit 600 for each of the switching devices 420, 430, 440, 450. The control circuit 600 has input lines 602, 604 which are respectively coupled to output lines 134, 136 of the transistor active bridge circuit 400. Thus, the voltage appearing across input lines 602, 604 will have the form of a rectified sine wave as shown.

The control circuit 600 also includes a pair of output lines 606, 608 which are respectively connected to control lines 496, 498 of the transistor active bridge circuit 400. The control circuit 600 is configured to generate a control signal for controlling the switching devices 420, 430, 440, 450. In this regard, if should be appreciated that the control circuit 600 provides a control current which positively biases the light emitting diodes 462, 472, 482, 492 each time the rectified sine wave input signal at input lines 602, 604 approaches a zero (0) value. The control circuit forms an open circuit to effectively eliminate the control current applied to the light emitting diodes 462, 472, 482, 492 when the rectified sine wave input signal at input lines 602, 604 is not close to a zero (0) value. Those skilled in the art will appreciate that control circuit 600 can be any suitable control circuit provided that it is capable of providing control currents as described herein.

Figure 7:
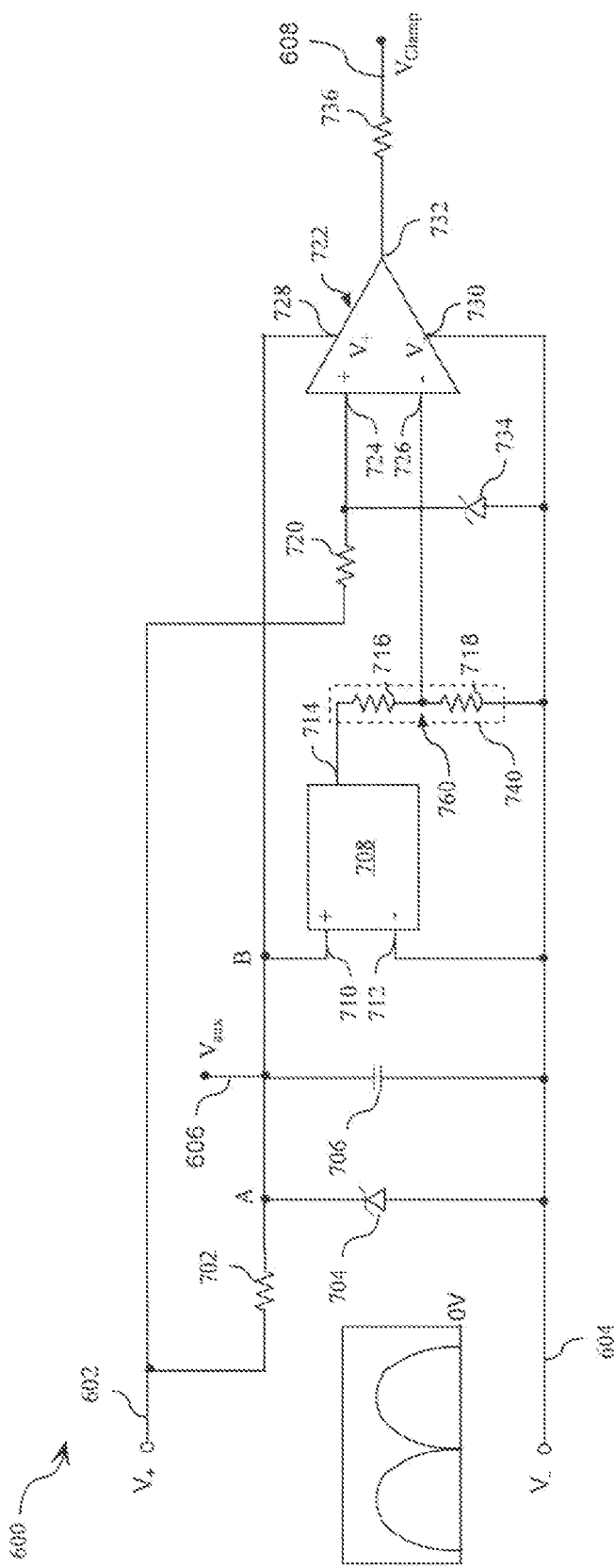
FIG. 7 is a schematic representation of a control circuit for driving a shoot-through protection circuit.

Referring now to FIG. 7, there is provided a schematic representation of one example of a suitable control circuit 600 which can be used in connection with the present invention. However, it should be understood that the invention is not limited in this regard. As shown in FIG. 7, the control circuit 600 is comprised of a voltage reference 708 and a comparator 722. It should be understood that the voltage reference 708 and comparator 722 collectively provide a zero-crossing detector circuit. The zero-crossing detector circuit is configured to detect when an input voltage of the transistor active bridge circuit 400 is approaching within a predetermined range approximating a value around zero (0) volts. The control circuit 600 is also comprised of a shunt regulator 704, resistors, 702, 720, a capacitor 706, a zener diode 734, and a voltage divider circuit 740.

The components 702, 704, 706 are provided for regulating the rectified sine wave input voltage. As shown in FIG. 7, a resistor 702 is connected in series with input line 602. The resistor 702 ensures that a current through the shunt regulator 704 will not exceed a maximum amount of current that is within a safe operating capability of the shunt regulator 704. According to one embodiment, the shunt regulator can be a zener diode.

As shown in FIG. 7, the shunt regulator 704 is connected in parallel with the capacitor 706. The capacitor 706 is provided for creating a substantially smooth DC voltage $V_{aux}$ by filtering the rectified sine wave input voltage appearing on input lines 602, 604. The capacitor 706 is connected in series with the resistor 702. The resistor 702 and capacitor 706 collectively provide an RC circuit. RC circuits are well known to persons skilled in the art, and therefore will not be described in great detail herein. The shunt regulator 704 serves as a control device to regulate the voltage across the voltage reference 708 and the comparator 722. As should be understood, the shunt regulator 704 begins conducting at a specified voltage. The shunt regulator 704 will hold its terminal voltage at the specified voltage. It should be understood that the voltage regulation can be shunt or series. Accordingly, the shunt regulator 704 can include a zener diode or any other suitable voltage regulator device. Still, the invention is not limited in this regard.

Referring again to FIG. 7, the capacitor 706 is electrically coupled to the voltage reference 708. The voltage reference 708 is comprised of a $V_+$ terminal 710, a $V_-$ terminal 712, and an output terminal 714. The $V_+$ terminal 710 and the $V_-$ terminal 712 are connected in parallel with the shunt regulator 704 and capacitor 706. As such, the substantially smooth direct voltage $V_{aux}$ is provided at output terminal 606. When the voltage at the $V_+$ terminal 710 is positive relative to the $V_-$ terminal 712, the voltage reference 708 produces a highly regulated output voltage at its output terminal 714. The output voltage is of a constant value irrespective of a fluctuation in value of the voltage $V_{aux}$. According to an embodiment of the invention, the voltage reference 708 is a series reference. The series reference is selected as an AD582 high precision voltage reference available from Analog Devices of Norwood, Mass. Still, the invention is not limited in this regard. For example, the voltage reference 708 can alternatively be selected as a shunt reference.

As shown in FIG. 7, the output terminal 714 of the voltage reference 708 is electrically coupled to the comparator 722 through the voltage divider circuit 740. The comparator 722 is preferably a low power, low offset voltage comparator. For example, the comparator 722 can be an LM339 comparator available from National Semiconductor Corporation, of Santa Clara, Calif. Still, the invention is not limited in this regard. The comparator 722 can be comprised of any circuit known in the art, provided that it has suitable specifications for a particular control circuit 600 application.

Referring again to FIG. 7, the comparator 722 is comprised of a non-inverting input terminal 724, an inverting input terminal 726, a $V_+$ terminal 728, a $V_-$ terminal 730, and an output terminal 732. The non-inverting input terminal 724 is electrically coupled to the rectified sine wave input voltage through the resistor 720. The inverting input terminal 726 is electrically coupled to the voltage reference 708 through the voltage divider circuit 740. As shown in FIG. 7, the $V_+$ terminal 728 of the comparator is coupled to the regulated voltage provided by the shunt regulator 704. The $V_-$ terminal 730 is coupled to the input line 604.

According to an aspect of the invention, the comparator 722 is an open collector type device. In this regard it should be appreciated that if a voltage at the non-inverting input terminal 724 is more positive than a voltage of the inverting input terminal 726, then the output of the comparator 722 is an open circuit. Alternatively, if a voltage at terminal 724 is less positive than a voltage at terminal 726, then $V_{OUT}$ is forced to the comparator's negative saturation level.

As shown in FIG. 7, the circuit 600 can include a voltage clamping circuit to ensure that the voltage at the non-inverting input terminal 724 of the comparator 722 does not become excessively large as the pulsating voltage generated by the voltage source 101 is increased. Any suitable voltage clamping circuit can be used for this purpose. For example, the voltage clamp could be simply implemented as a resistor 720 connected in series with a zener diode 734. The resistor 720 and zener diode 734 can ensure that the voltage between the input line 604 and the non-inverting input terminal 724 is limited so that the comparator 722 is not damaged.

As shown in FIG. 7, a voltage divider circuit 740 is provided between the voltage reference 708 and the inverting input terminal 726 of the comparator 722. The voltage divider circuit is comprised of a first resistor 716 and a second resistor 718 connected in series. However, those skilled in the art will appreciate that numerous different types of voltage dividers circuits are possible and can be used without limitation.

The first resistor 716 is connected to the output terminal 714 of the voltage reference 708 and to the inverting input terminal 726 of the comparator 722. The second resistor 718 is connected to the inverting input terminal 726 of the comparator 722 and to the input line 604. The voltage divider circuit advantageously provides a voltage tap 760. For example, if a resistive voltage divider circuit is used as shown in FIG. 7, then the voltage tap can be provided at a connection point between the first and second resistors 716, 718. The voltage tap 760 advantageously provides a reduced voltage output relative to the input voltage applied to the voltage divider circuit by the voltage reference 708. For example, the voltage tap 760 of the voltage divider circuit 740 can provide an output that is reduced by ten percent (10%) to ninety percent (90%) relative to the output voltage of the voltage reference 708.

If a resistive voltage divider is used as shown in FIG. 7, then the voltage at the inverting input terminal 726 ($V_{726}$) can be expressed by a mathematical Equation (1):

$$V_{726} = V_{708} \times [R_{716}/(R_{716}+R_{718})] \qquad (1)$$

where $V_{708}$ is the output voltage of the voltage reference 708. $R_{716}$ is the resistance value of the resistor 716. $R_{718}$ is the resistance value of the resistor 718.

As shown in FIG. 7, the output terminal 732 of the comparator 722 is electrically coupled to a current limiting resistor 736. The current limiting resistor is coupled to output line 608. The output line 608 is connected to control line 498 in FIG. 4.

The operation of the circuit 600 will now be described in greater detail. The voltage divider circuit 740 provides a highly regulated output voltage at a voltage tap 760 which is coupled to the $V_-$ terminal 726 of the comparator 722. This highly regulated voltage is used as a threshold voltage to determine when an instantaneous voltage of the rectified sine wave at input lines 602, 604 is approaching zero (0) volts, for example, the voltage appearing at voltage tap 760 can be selected to be around one (1) or two (2) volts.

The rectified sine wave input voltage is applied to $V_+$ terminal 724. When the instantaneous value of the rectified sine wave input voltage at terminal 724 is more positive as compared to the voltage at the $V_+$ terminal 726, then the output of the comparator 722 is an open circuit and the light emitting diodes 462, 472, 482, 492 will not be forward biased. However, when the instantaneous voltage of the rectified sine wave applied to $V_+$ terminal 724 is less positive compared to the voltage at the $V_-$ terminal 726, then output voltage $V_{OUT}$ of the comparator 722 is forced to the comparator's negative saturation level. Consequently the light emitting diodes 462, 472, 482, 492 will be forward biased.

Referring now to FIG. 8, there is provided a time graph showing a moment in time 802 when an input voltage zero crossing of an instantaneous voltage defining an AC input of the transistor active bridge circuit 400 occurs. The time graph also shows a time period 804 associated with the voltage zero crossing. This time period 804 is determined in a voltage domain by measuring when an input voltage crosses a threshold voltage which is offset by a small amount relative to zero (0) volts. The time period 804 includes the moment in time 802 when an input voltage zero crossing actually occurs. The beginning of the time period 804 occurs a predetermined duration 806 before the moment in time 802 when an input voltage zero crossing actually occurs. The predetermined duration is determined in a voltage domain by measuring when an input voltage crosses the threshold voltage.

It should be noted that the conduction path (or conduction channel) between the source and drain of each field effect transistor 102, 104, 106, 108 is selectively eliminated (or disabled) by the switching device 420, 430, 440, 450 during at least a portion of the time period 804. The predetermined duration 806 can be selected to correspond to a response time necessary to selectively eliminate (or disable) the conduction path (conduction channel) between the source and drain of each field effect transistor 102, 104, 106, 108.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

I claim:

1. A rectifier circuit connectable between a pair of input lines and a pair of output lines, comprising:
a plurality of field effect transistors coupled together to define a rectifier circuit, said plurality of field effect transistors comprising:
a first and second field effect transistor of a first channel type, a source-drain path of said first field effect transistor connected in series with a source-drain path of said second field effect transistor to form a first series transistor combination connected across said input lines, wherein a shoot-through current can occur when said first and second field effect transistors conduct simultaneously;
a third and fourth field effect transistor of a second channel type different from said first channel type, a source-drain path of said third field effect transistor connected in series with a source-drain path of said fourth field effect transistor to form a second series combination connected across said input lines, wherein a shoot-through current can occur when said third and fourth field effect transistors conduct simultaneously;
a control circuit configured to generate a control signal when said control circuit detects that an instantaneous input voltage across said input lines is approaching zero; and
a switching device provided for each of said field effect transistors, said switching device connected between a gate and a source of a respective one of said field effect transistors and configured to prevent said shoot-through current by selectively disabling a conduction channel extending between said source and a drain of said respective one of said field effect transistors in response to said control signal.

2. The rectifier circuit according to claim 1, wherein said switching device comprises a phototransistor.

3. The rectifier circuit according to claim 1, wherein said switching device further comprises a photocoupler coupled to said control circuit.

4. The rectifier circuit according to claim 1, wherein said rectifier circuit is a full wave bridge rectifier.

5. The rectifier circuit according to claim 1, wherein said control circuit comprises at least a zero-crossing detector circuit which is configured to detect when the instantaneous input voltage of said rectifier circuit is approaching within a predetermined range approximating a value around zero volts.

6. The rectifier circuit according to claim 2, wherein said switching device further comprises a light emitting diode coupled to said control circuit.

7. The rectifier circuit according to claim 4, wherein said zero-crossing detector circuit comprises at least one voltage reference device for establishing a voltage reference for determining a zero crossing.

8. The rectifier circuit according to claim 5, further comprising a comparator coupled to said voltage reference.

9. A method for controlling a shoot-through current in a rectifier circuit constructed from a plurality of field effect transistors connected between a pair of input lines and a pair of output lines, said method comprising:
connecting a switching device across a gate and a source of each of said plurality of field effect transistors of said rectifier circuit;
detecting at a control circuit when an instantaneous input voltage across said input lines is approaching zero, said control circuit connected to said switching device;
in response to said detection, generating at said control circuit a control signal for preventing a shoot-through current in said rectifier circuit;
in response to said control signal, preventing said shoot-through current in said rectifier circuit by selectively disabling a conduction channel extending between said source and a drain of said at least one of said field effect transistors.

10. The method according to claim 9, wherein said detecting step further comprises determining when said instantaneous input voltage is within a predetermined range approximating a value around zero volts.

11. The method according to claim 9, wherein said preventing step further comprises forming a low resistance path between said gate and said source of said at least one of said field effect transistors.

12. The method according to claim 9, further comprising forward biasing a light emitting diode with said control signal to generate a photonic emission from said light emitting diode.

13. The method according to claim 9, further comprising selecting said rectifier circuit to include four field effect transistors, and arranging said field effect transistors to form a full wave bridge rectifier.

14. The method according to claim 12, further comprising exciting a phototransistor with said photonic emission to form a low resistance path between said gate and said source.

* * * * *